United States Patent
Nakahara et al.

(10) Patent No.: US 7,755,230 B2
(45) Date of Patent: Jul. 13, 2010

(54) ROTARY ELECTRIC MACHINE HAVING COOLING DEVICE AND ELECTRIC GENERATING SYSTEM INCLUDING THE MACHINE

(75) Inventors: Akihito Nakahara, Hitachi (JP); Akiyoshi Komura, Hitachi (JP); Kazumasa Ide, Hitachiota (JP); Kazuhiko Takahashi, Hitachi (JP); Kengo Iwashige, Hitachi (JP); Kenichi Hattori, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/026,646

(22) Filed: Feb. 6, 2008

(65) Prior Publication Data

US 2009/0195091 A1 Aug. 6, 2009

(51) Int. Cl.
H02K 9/00 (2006.01)
(52) U.S. Cl. .......................................... 310/53; 310/58
(58) Field of Classification Search ............. 310/52–55, 310/60 A, 57–69
See application file for complete search history.

(56) References Cited

U.S. PATENT DOCUMENTS

| | | | |
|---|---|---|---|
| 5,701,044 A | 12/1997 | Emshoff et al. | |
| 2004/0066099 A1* | 4/2004 | Weeber et al. | 310/58 |
| 2005/0186096 A1* | 8/2005 | Vinson et al. | 417/423.1 |
| 2005/0188701 A1* | 9/2005 | Kung et al. | 60/772 |
| 2006/0074570 A1* | 4/2006 | Belke et al. | 702/50 |
| 2008/0094231 A1 | 4/2008 | Hohn | |

FOREIGN PATENT DOCUMENTS

| | | |
|---|---|---|
| DE | 43 26 680 | 2/1995 |
| DE | 10 2005 004 862 | 8/2006 |
| EP | 1 780 885 | 5/2007 |
| JP | 10-042522 | 2/1998 |
| JP | 2000-350413 | 12/2000 |
| JP | 2003-284289 | 10/2003 |
| JP | 2005-210893 | 8/2005 |
| JP | 2006325347 A * | 11/2006 |
| JP | 2007-116792 | 5/2007 |
| RU | 2 177 669 | 12/2001 |
| WO | PCT 2007/051732 | 5/2007 |

OTHER PUBLICATIONS

Machine Translation of JP 2006325347 A, Watabe et al., Japan, Nov. 2006.*
esp@cenet translation Abstract RU2177669 (2001).*
MAchine Translation JP2006325347A (2006).*

* cited by examiner

*Primary Examiner*—Quyen Leung
*Assistant Examiner*—Jose A Gonzalez Quinones
(74) *Attorney, Agent, or Firm*—Antonelli, Terry, Stout & Kraus, LLP.

(57) ABSTRACT

A rotary electric machine which is smoothly operated with high efficiency by adequately controlling the cooling gas flow as needed to keep the highest temperature inside the rotary electric machine below a predetermined limit. The rotary electric machine includes a stator with armature windings wound around a stator core, a rotor placed inside the stator in a rotatable manner, and a cooling device for controlling cooling gas flow. It further includes a device for measuring an ambient temperature and a device for detecting armature voltage and/or armature current and/or field current. The temperature inside the rotary electric machine is calculated from the measured ambient temperature, detection value by the detecting device and an directive value of cooling gas flow. And a calculated suitable value of cooling gas flow is determined according to the calculated temperature inside the rotary electric machine.

15 Claims, 12 Drawing Sheets

| OUTPUT (%) | ATMOSPHERIC TEMPERATURE (°C) | | | | | |
|---|---|---|---|---|---|---|
| | 0 | 5 | 15 | 25 | 35 | 45 |
| 10 | 31 | 34 | 39 | 43 | 48 | 53 |
| 20 | 33 | 35 | 40 | 45 | 50 | 55 |
| 30 | 35 | 37 | 43 | 48 | 53 | 59 |
| 40 | 38 | 40 | 46 | 52 | 58 | 63 |
| 50 | 41 | | | | 63 | 70 |
| 60 | 46 | | REQUIRED COOLING | | 70 | 77 |
| 70 | 51 | | GAS FLOW (%) | | 79 | 86 |
| 80 | 57 | 62 | 71 | 79 | 88 | 97 |
| 90 | 65 | 69 | 79 | 89 | 99 | 109 |
| 100 | 72 | 78 | 89 | 100 | 111 | 122 |
| 110 | 81 | 87 | 100 | 112 | 124 | 137 |
| 120 | 91 | 98 | 111 | 125 | 139 | 153 |

ROTARY ELECTRIC MACHINE HAVING COOLING DEVICE AND ELECTRIC GENERATING SYSTEM INCLUDING THE MACHINE

BACKGROUND OF THE INVENTION

1. Field of the Invention

The present invention relates to a rotary electric machine with a cooling device for cooling inside of the rotary electric machine by controlling the cooling gas flow.

2. Description of the Related Art

A rotary electric machine with a cooling device for cooling inside of the rotary electric machine by the cooling gas flow is disclosed in JP-A No. 10-42522 where a cooling fan attached to a rotor circulates cooling gas into the rotary electric machine to cool it. The size of the cooling fan is determined so as to circulate the predetermined cooling gas flow to ensure the temperature inside the machine does not exceed a predetermined limit.

On the other hand, JP-A No. 2003-284289 describes a rotary electric machine having a controller which controls the cooling gas flow forcedly circulated by a cooling fan, in response to the cooling fan inlet temperature and the load current. The controller controls a cooling gas circulation according to the temperature of gas introduced into, or exhausted from, the rotary electric machine. The control is performed based on the relation between cooling gas temperature and required cooling gas flow as obtained from measurements of an actual rotary electric machine or its machine model so that the machine temperature does not exceed a predetermined value.

In large turbine generator with a plurality of gas flow sections in the axial direction, the temperature inside the rotary electric machine may be considerably different from one point to another depending on the axial position. For example, according to the result of coils temperature analysis of the generator coils described in JP-A No. 2005-210893, the difference between the highest and lowest temperatures reaches almost 80K.

In the conventional rotary electric machine cooling system using a cooling fan which has been often adopted in turbine generators, cooling gas is circulated at a constant flow rate so that the temperature inside the machine does not exceed a limit. However this system has a problem that when the temperature inside the machine is low because of a low ambient temperature or low load ratio, the excess cooling gas flow which result in excess is circulated which lead to energy loss. Here the ambient temperature corresponds to the temperature of gas outside the generator, except the temperature of gas introduced into, or exhausted from, the generator.

On the other hand, other conventional controller controls the cooling gas flow according to the temperature of gas introduced into, or exhausted from, the rotary electric machine. However, a large scale and axially long rotary electric machine with a plurality of gas flow sections in the axial direction, the temperature inside the rotary electric machine may be considerably different from one point to another depending on the axial position and therefore, if the gas flow control is based on the temperature of gas introduced into, or exhausted from, the rotary electric machine, it is impossible to always ensure that the maximum temperature inside the rotary electric machine does not exceed a predetermined value.

In a portion of the rotary electric machine where the temperature exceeds the predetermined value, coil insulation deterioration or uneven thermal coil expansion might occur, causing damage to the coils or the core. If the cooling gas flow is determined by considering a probable temperature distribution and the temperature differences are considerable, cooling gas may be more circulated than needed in some parts of the rotary electric machine, resulting in more loss.

In case of large rotary electric machines, since the specification varies with each machine units, sufficient measurement data of the actual rotary electric machine or its machine model may not be obtained.

An object of the present invention is to provide a rotary electric machine which runs smoothly with high efficiency by adequately controlling the cooling gas flow as needed to maintain the rotary electric machine's maximum temperature below a predetermined limit.

SUMMARY OF THE INVENTION

According to one aspect of the invention, there is provided a rotary electric machine which includes a stator with armature windings wound around a stator core, a rotor with field windings wound around a rotor core, a cooling device for controlling cooling gas flow, a detecting device for detecting armature voltage and armature current, and a device for measuring an ambient temperature. In the rotary electric machine, the cooling gas flow is controlled according to the relation between the maximum temperature inside the rotary electric machine and required cooling gas flow as calculated by analysis of the detected armature voltage and armature current and the ambient temperature so that the highest temperature inside the rotary electric machine does not exceed a predetermined limit.

In the rotary electric machine according to the first aspect, predetermined value may be used instead of the detected value for the armature voltage.

In the above rotary electric machine, it is also possible that the physical data to be detected is a field current value instead of armature voltage and armature current values. Or in the above rotary electric machine, it is also possible that the physical data to be detected is a field current value in addition to the armature voltage and the armature current values.

The above rotary electric machine may be provided with a device for calculating the highest temperature inside the rotary electric machine or temperature distribution inside the rotary electric machine and the required cooling gas flow based on the detected armature voltage, armature current and ambient temperature.

For the above rotary electric machine, the relation of armature voltage and/or armature current and/or ambient temperature with the highest temperature inside the rotary electric machine and the required cooling gas flow may be analyzed and tabularized to make a look-up table so that cooling gas flow control is performed in reference to this look-up table.

The above rotary electric machine may include an axial cooling fan attached to the rotor to share the function of supplying cooling gas with the cooling device for controlling cooling gas flow.

According to a second aspect of the invention, there is provided a rotary electric machine which includes a stator with armature windings wound around a stator core, a rotor with field windings wound around a rotor core, a cooling device for controlling cooling gas flow, and a plurality of temperature detecting devices inside the rotary electric machine. In this rotary electric machine, the highest temperature inside the rotary electric machine is calculated based on detected temperatures and the positions of the temperature detecting devices, and cooling gas flow is controlled according to the relation between the highest temperature inside the rotary electric machine and required cooling gas flow so that the highest temperature inside the rotary electric machine does not exceed a predetermined limit.

The rotary electric machine according to the second aspect may include a device for calculating the highest temperature inside the rotary electric machine or temperature distribution inside the rotary electric machine and the required cooling gas flow from detected temperature inside the rotary electric machines and the positions of the temperature detecting devices.

The rotary electric machine according to the second aspect may include a storage device which stores a plurality of patterns of data on the load condition or ambient temperature and highest temperature inside the rotary electric machine and required cooling gas flow in advance so that these patterns are called for control of cooling gas flow.

In the rotary electric machine according to the second aspect, the rotor may be provided with a cooling fan which shares the function of supplying cooling gas with the cooling device for controlling cooling gas flow.

According to a third aspect of the invention, there is provided a rotary electric machine which includes a stator with armature windings wound around a stator core, a rotor with field windings, a stator frame housing the stator and the rotor, a plurality of gas flow sections axially separated by partitions between the stator core and the stator frame, a plurality of cooling devices corresponding to the respective gas flow sections, a device for detecting armature voltage and armature current and a device for measuring an ambient temperature. In the rotary electric machine, the cooling gas flow of the cooling device in the highest temperature gas flow section is increased according to the relation between the highest temperature inside the rotary electric machine and required cooling gas flow as calculated by analysis of the detected the armature voltage and the armature current and the ambient temperature so that the highest temperature inside the rotary electric machine does not exceed a predetermined limit.

The rotary electric machine according to the third aspect may include an axial cooling fan attached to the rotor to share the function of supplying cooling gas with the cooling devices for controlling cooling gas flow.

According to a fourth aspect of the invention, there is provided an electric generating system which includes a stator with armature windings wound around a stator core, a rotor with field windings wound round a rotor core, a cooling device for controlling cooling gas flow, an abnormal temperature detecting device for the cooling device, and a device for communication with a control room responsible for operation of a rotary electric machine. In this system, if the abnormal temperature detecting device detects an abnormal temperature, an alarm of abnormal temperature is given to the control room.

In the above system, it is also possible that if the abnormal temperature detecting device detects an abnormal temperature, a notice of abnormal temperature can be given to a control room for the prime mover such as turbine etc.

According to a fifth aspect of the invention, there is provided an electric generating system which includes a cooling device for controlling cooling gas flow, a device for detecting armature current and a device for measuring an ambient temperature and is operated by inputting an armature voltage. In this system, the cooling gas flow is controlled according to the relation between the highest temperature inside the rotary electric machine and required cooling gas flow as calculated by analysis of the directive value of armature voltage and the detected armature current and ambient temperature so that the highest temperature inside the rotary electric machine does not exceed a predetermined limit.

In the above configurations, temperature test results from suitable testing method may be used to calculate the highest temperature or temperature distribution. For example, A heat-run test at a specified voltage with the terminals open-circuited, a heat-run test at a specified armature current with the terminals short-circuited, and a zero excitation no-load heat-run test conducted in accordance with the equivalent temperature testing method are used in this case.

Furthermore, in these configurations, an electric cooling fan driven by a variable speed motor or an axial cooling fan with variable angle blades may be used as a cooling device for controlling cooling gas flow.

Accordingly the present invention provides a rotary electric machine which runs with high efficiency by adequately controlling the cooling gas flow as needed to keep the highest temperature inside the rotary electric machine below a predetermined safety limit and assure sound operation.

BRIEF DESCRIPTION OF THE DRAWINGS

The invention will be more particularly described with reference to the accompanying drawings, in which.

DETAILED DESCRIPTION OF THE PREFERRED EMBODIMENTS

Next, preferred embodiments of the present invention will be described. The preferred embodiments described below each exemplify a rotary electric machine as a winding field type generator with field windings wound around a rotor core; however, the present invention is not limited thereto but may be applied to a generator or motor which uses a permanent magnet as a magnetic field source. Also it may be applied to an induction generator or induction motor.

First Embodiment

Figure 1:
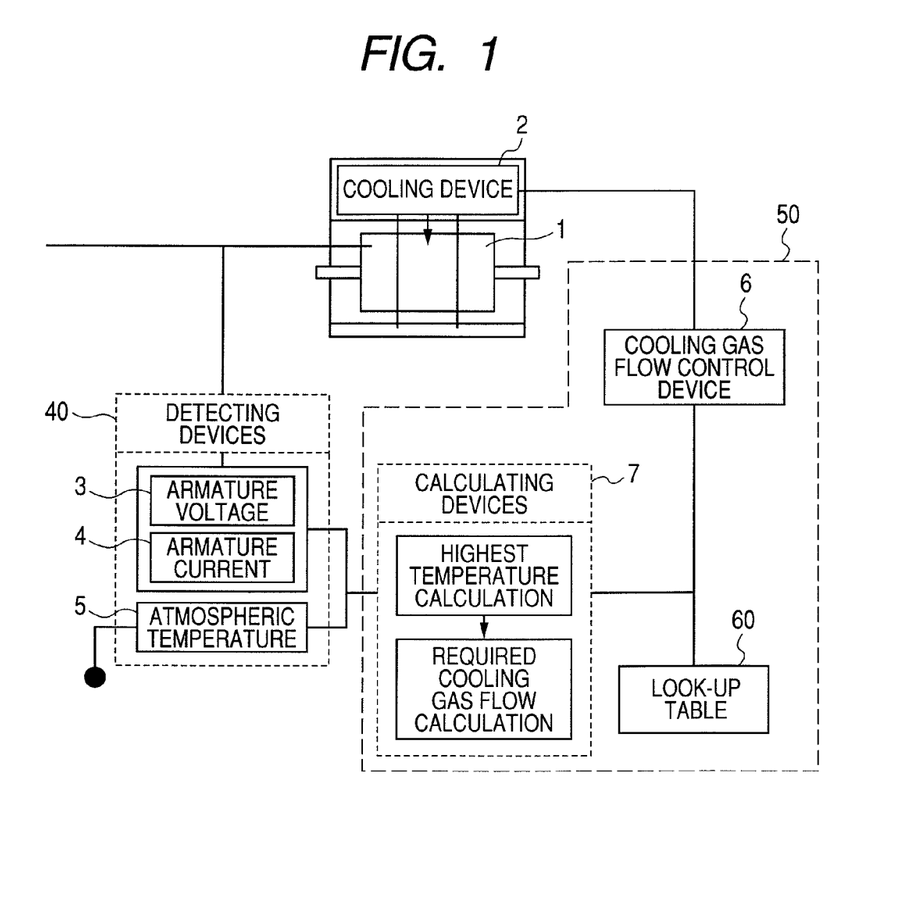
FIG. 1 shows the configuration of a first embodiment of the present invention.

FIG. 1 shows the configuration of a first embodiment of the present invention. In a rotary electric machine 1, the inside of the rotary electric machine is cooled by a cooling device 2 for controlling the cooling gas flow. A detecting device 40 includes an armature voltage detecting device 3, an armature current detecting device 4 and an ambient temperature detecting device 5. A control means 50 includes a calculating device 7 which contains CPU or other electronic circuit, a cooling gas flow control device 6 which contains CPU or suitable electronic circuit etc and a storage device made of look-up table 60 with the data of gas flow rate. The look-up table 60 may also include the predetermined directive value or design value of the cooling gas flow the armature voltage, the armature current and the magnetic field current of the machine. The cooling gas flow control device 6 may be included in a part of the calculating device 7. The calculating device 7 calculates the estimated highest temperature inside the rotary electric machine from the results of detecting device 40. And the calculating device 7 then calculates the required cooling gas flow for the highest temperature inside the rotary electric machine not to exceed a predetermined limit. The cooling gas flow control device 6 controls the cooling gas flow of the cooling device 2 to attain the necessary cooling gas flow rate determined by the calculating device 7. This embodiment is useful when the stator temperature is expected to be higher than the rotor temperature, as the armature voltage and armature current is mainly used for a control data of cooling gas flow.

Figure 2:
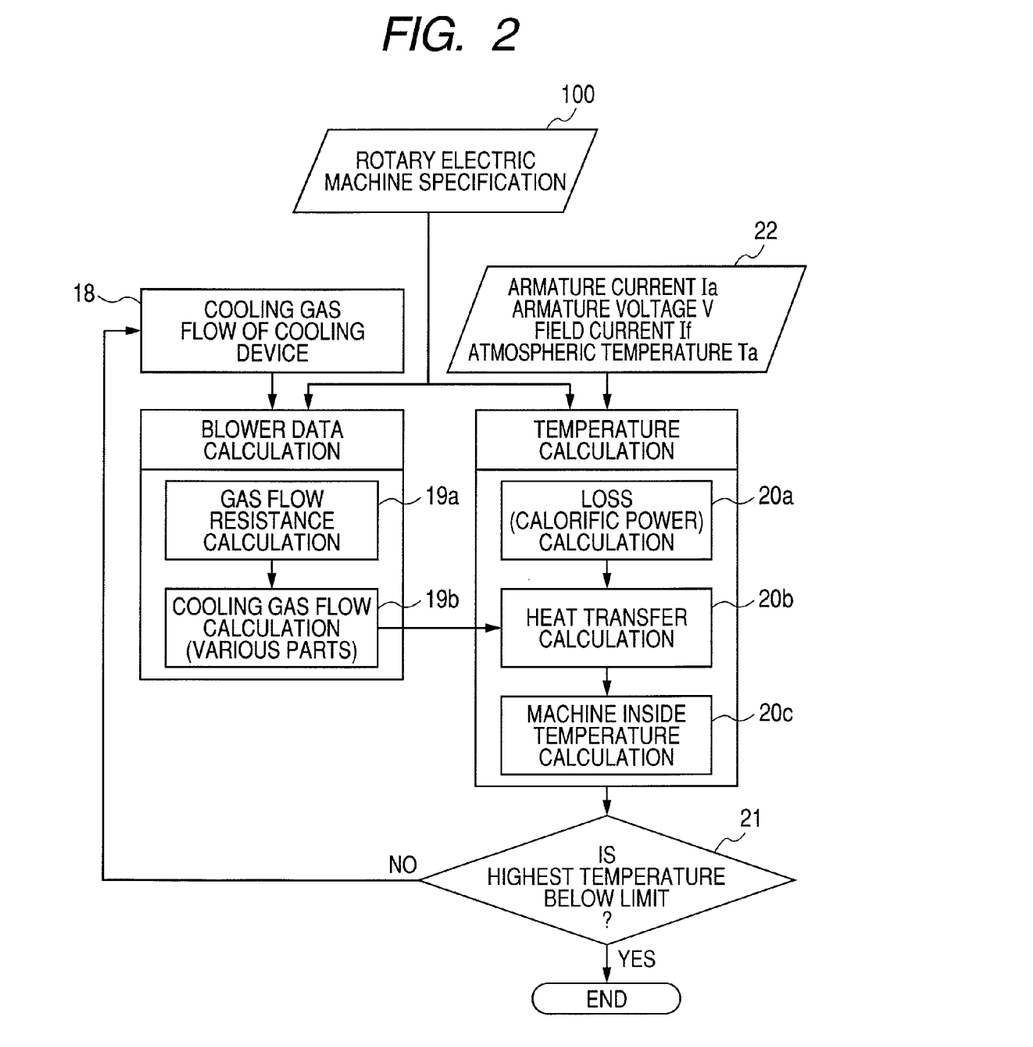
FIG. 2 illustrates a flow chart of cooling gas flow calculating process.

FIG. 2 shows a flow chart of the general process of calculating the estimated highest temperature and required cooling gas flow of the rotary electric machine 1. The process of calculating the required cooling gas flow is basically divided into two processes. The one is calculating the cooling gas flow and the other is calculating the temperature distribution in the rotary electric machine 1. In the cooling gas flow calculating process, the resistance against to cooling gas flow is calculated in step 19a from the rotary electric machine's specification data 100. And cooling gas flow rate data 18 and gas flow rate q of cooling gas circulating in various parts in the rotary electric machine is calculated in step 19b.

In the temperature calculating process, losses or calorific power generated inside the rotary electric machine 1 is calculated in step 20a from the rotary electric machine's specification data 100 and input data 22 (including armature voltage V, armature current $I_a$, field current $I_f$ and atmosphere temperature $T_a$).

Losses in the armature (stator) or calorific power $Q_s$ are expressed by the sum of calorific power $Q_c$ of the armature windings and calorific power $Q_1$ of the core where both $Q_c$ and $Q_i$ are the function of V and $I_a$.

$$Q_s = Q_c(V, I_a) + Q_i(V, I_a)$$

Calorific power $Q_R$ of the rotor is expressed by the sum of calorific power $Q_m$ generated by mechanical loss such as friction and calorific power $Q_f$ of the field windings where $Q_f$ depends on $I_f$. Here, when the size of the rotary electric machine 1 and its revolution speed are fixed, $Q_m$ is not dependent on voltage and current but constant.

$$Q_R = Q_m + Q_f(I_f)$$

The above calorific power, as a heat source, is allocated to each elements.

Next, the amounts of heat transferred to various parts of the machine are calculated in step 20b according to this calorific power and the cooling gas flow of the various parts as calculated previously.

Generally, the temperature difference between two points in the thermal system ($\theta_1 - \theta_2$) is expressed by the product of transferred heat $Q_e$ and thermal resistance $R_T$ of the part concerned.

$$\theta_1 - \theta_2 = R_T Q_e$$

In case of a heat conduction element, thermal resistance $R_T$ is in proportion to heat conduction distance $\delta$ and in inverse proportion to heat conductivity $\lambda$ and heat transfer area A as shown in Equation 1.

$$R_T = \frac{\delta}{\lambda A} \qquad \text{(Equation 1)}$$

In case of a heat transfer element, thermal resistance $R_T$ is in inverse proportion to heat transfer coefficient $\alpha$ and heat transfer area A as shown in Equation 2.

$$R_T = \frac{1}{\alpha A} \qquad \text{(Equation 2)}$$

In the temperature calculation in step 20c, the temperature of the solid heating part is first calculated and then the temperature of the fluid as cooling gas is calculated. The fluid temperature rise $\Delta T$ depending on the quantity of heat from a heat transfer element is in proportion to the quantity of heat $\Delta Q$ to the fluid element and in inverse proportion to the cooling gas flow q and isobaric specific heat $C_P$ of the cooling gas as shown in Equation 3. Here, the flow rate q of the cooling gas as calculated previously before the temperature calculation is used.

$$\Delta T = \frac{\Delta Q}{q C_P} \qquad \text{(Equation 3)}$$

The result of calculation of each part's temperature rise is compared with the temperature rise at the previous step and if the temperature difference become smaller than a predetermined value, it is considered that the temperature rise is about to stop. Then the calculated temperature rise is added to the initial temperature $T_a$ (ambient temperature) and the sum is sent to the step 21 of decision about the highest temperature.

This embodiment uses detected values for armature voltage and armature current and a predetermined value for field current. The cooling gas flow is increased until the calculated highest temperature inside the rotary electric machine decreases below the predetermined limit, and the above steps are repeated to calculate the required cooling gas flow to satisfy the temperature limit.

Figure 10:
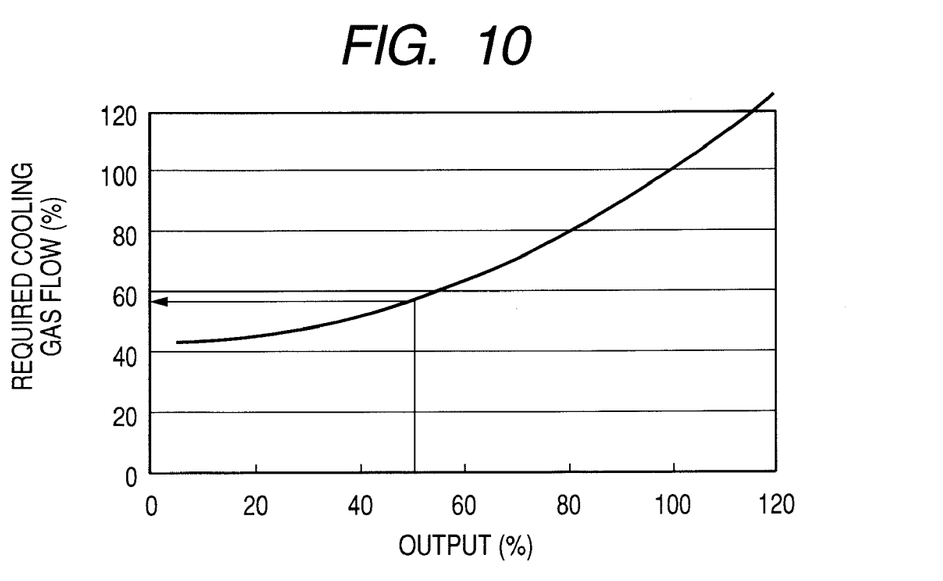
FIG. 10 shows the relation between machine output and required cooling gas flow for a rotary electric machine.
Figure 12:
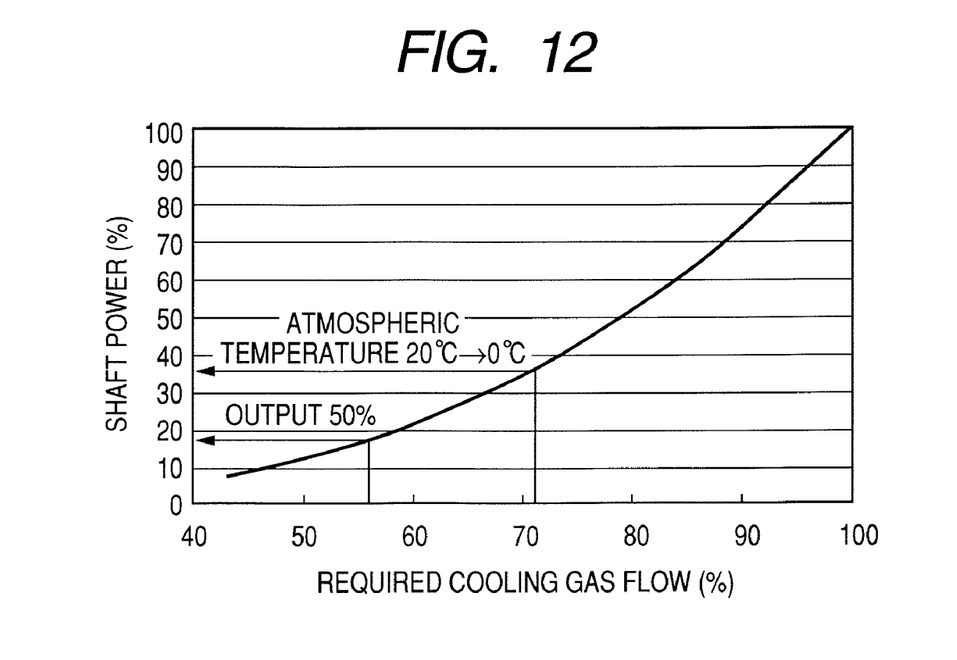
FIG. 12 shows the relation between cooling gas flow and cooling fan power.

FIG. 10 shows one example of the general relation between the output of the rotary electric machine and the required cooling gas flow. Here, if a cooling fan for controlling cooling gas flow is used as a cooling device to cool the inside of the rotary electric machine, the relation between the required cooling gas flow and shaft power of the cooling fan is as shown in FIG. 12. In FIGS. 10 and 12, the required cooling gas flow and shaft power are expressed in percentage where their values are 100% when output of the rotary electric machine is 100%.

For example, if the rotary electric machine 1 is operated at 50% output, the required cooling gas flow is about 60% according to FIG. 10. And the shaft power required for the cooling fan to provide 60% of cooling gas flow is less than 20% according to FIG. 12. In the present invention, the cooling gas flow of the cooling fan as a cooling device is variable and the cooling gas flow is controlled at the required level depending on the highest temperature, so that loss or waste of energy is reduced and high operational efficiency is achieved. In this example, saving of a shaft loss power is achieved up to about 80%.

Figure 11:
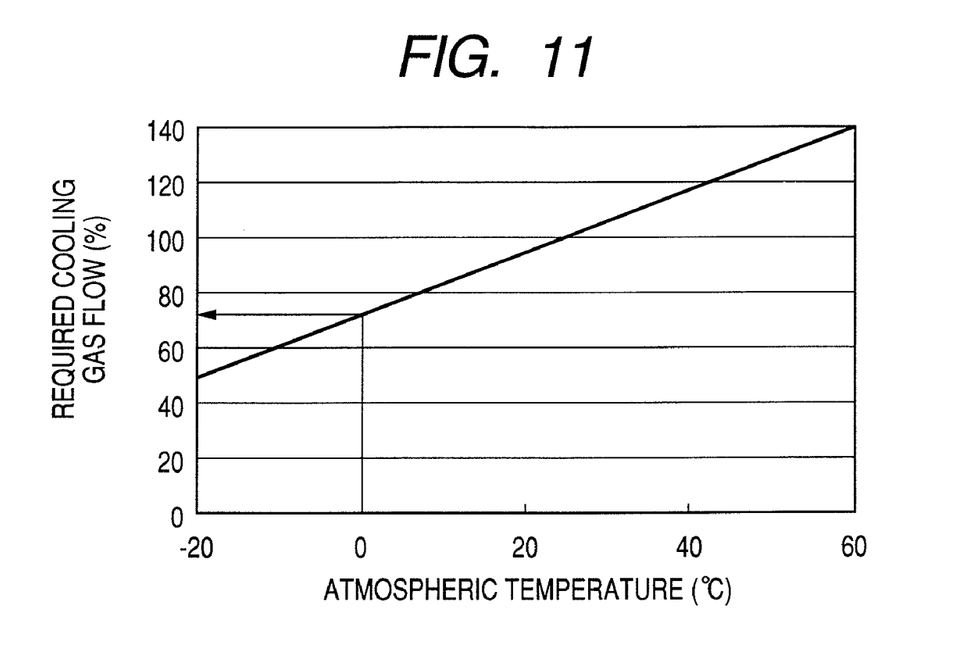
FIG. 11 shows the relation between ambient temperature and required cooling gas flow for a rotary electric machine.

As another example, FIG. 11 shows the relation between ambient temperature and the required cooling gas flow for a rotary electric machine. Here, if a cooling fan for controlling cooling gas flow is used as a cooling device to cool the inside of the rotary electric machine, the relation between the required cooling gas flow and shaft power is as shown in FIG. 12. In FIGS. 11 and 12, the required cooling gas flow and shaft power are expressed in percentage where their values are 100% when the ambient temperature of the rotary electric machine is 25° C.

For example, if the rotary electric machine is operated at 0° C., the required cooling gas flow is about 70% according to FIG. 11 and the required shaft power is less than 40% according to FIG. 12. In the present invention, the cooling gas flow of the cooling fan as a cooling device is variable and the cooling gas flow is controlled the required level depending on the highest temperature, so that loss or waste of energy is reduced and high operational efficiency is achieved. In this example, a saving of the shaft power is achieved up to about 60%.

Figure 13:
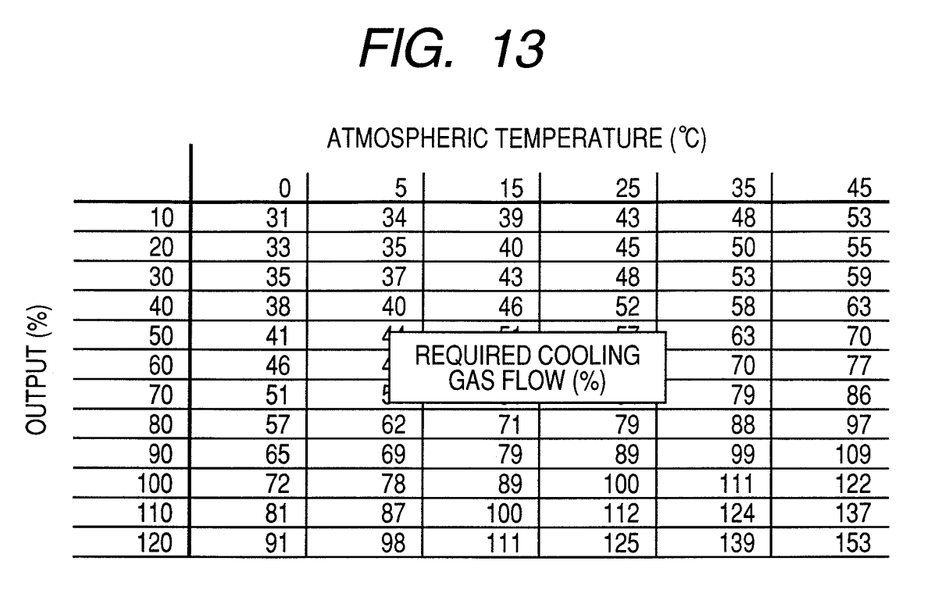
FIG. 13 shows an example of a look-up table of required cooling gas flow ratios in relation to rotary electric machine output and ambient temperature.

An example of the content of the look-up table 60 is shown in FIG. 13. It is preferable to provide a look-up table indicating the relation between rotary electric machine output and required cooling gas flow, and that between ambient temperature and required cooling gas flow as shown in FIG. 13. A look-up table 60 is provided in the control means 50 in advance in order to save the time of repeating calculation processes and get information on the required cooling gas flow more easily. Also it is preferable to prepare a look-up table of cooling gas flow rate required on a specified time basis.

The above data concerning the required cooling gas flow and shaft power depending on ambient temperature is just an example for a typical rotary electric machine and such data differs in each rotary electric machine.

Figure 14:
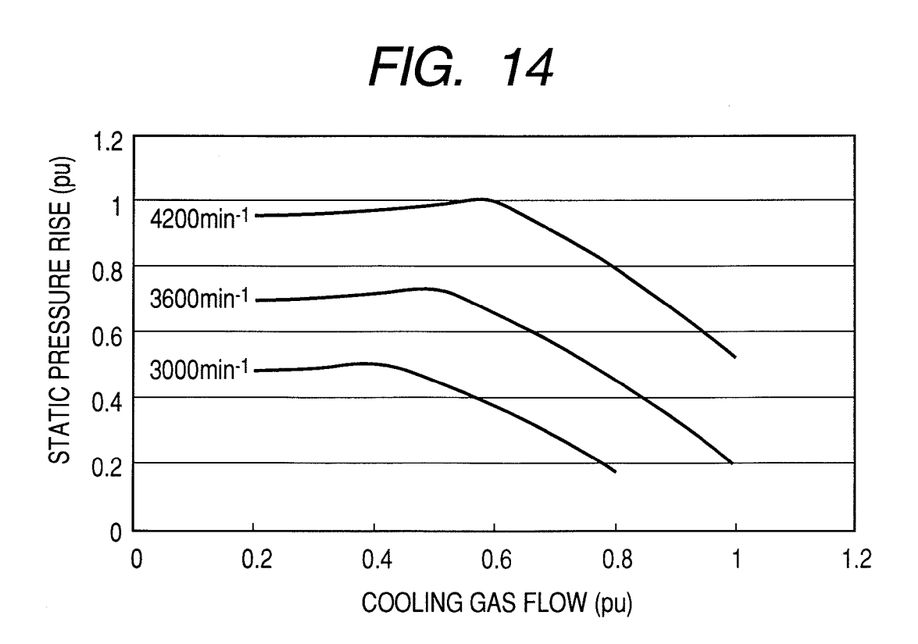
FIG. 14 shows cooling gas flow versus pressure characteristics in relation to motor revolution speed ($min^{-1}$) in a variable speed cooling fan.

In the above cases, it is assumed that a cooling fan driven by a variable speed motor is used as a cooling device for controlling cooling gas flow. Specifically, the cooling device for controlling gas flow controls the revolution speed of the motor according to the required cooling gas flow. FIG. 14 shows cooling gas flow of the cooling fan versus pressure characteristics in relation to motor revolution speed (min$^{-1}$:). The use of a variable speed motor to control the revolution speed permits cooling gas flow control without the need for a mechanical component such as a baffle.

In the embodiment, the highest temperature inside the rotary electric machine is calculated from the detected armature voltage, armature current and atmospheric temperature. And the required cooling gas flow of the cooling device 2 is determined according to the calculated highest temperature. Accordingly, the highest temperature inside the rotary electric machine does not exceed a predetermined limit and the cooling gas flow is controlled to the required level.

Therefore, the rotary electric machine is operated with high efficiency with reduced loss or waste of energy. Since the required cooling gas flow is determined depending on the highest temperature inside the rotary electric machine, there is no need to prepare a wasteful margin for the cooling temperature and the cooling gas flow is controlled adequately as needed even in a rotary electric machine with a axial long length.

In addition, since the highest temperature is calculated from the armature voltage, armature current and ambient temperature, the rotary electric machine is operated with optimum operational efficiency, in response to changes in the current, voltage and ambient temperature.

Second Embodiment

Figure 3:
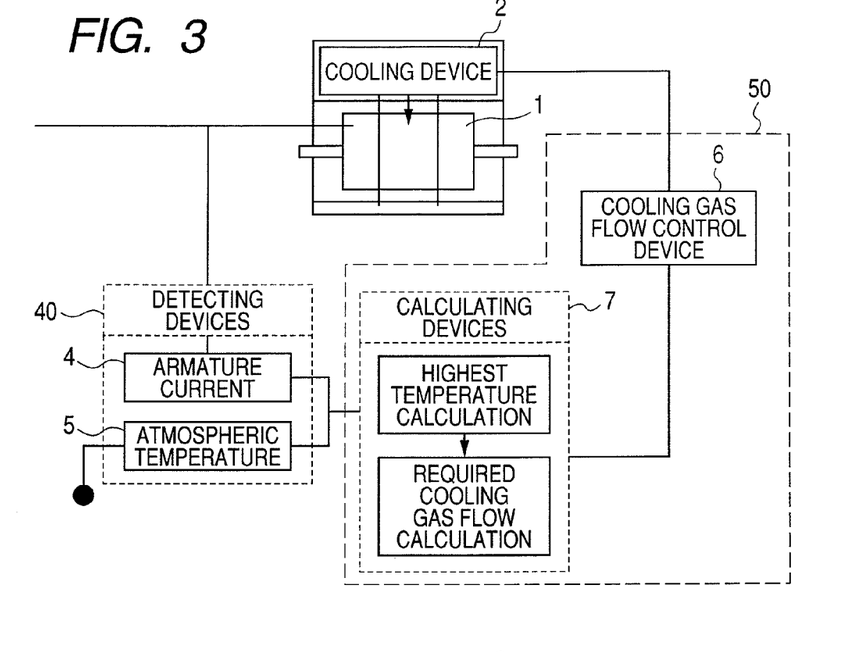
FIG. 3 shows the configuration of a second embodiment of the present invention.

FIG. 3 shows the configuration of a second embodiment of the present invention. If it is previously known that variation in the armature voltage is small, or if an directive value can be used for the armature voltage, the highest temperature is calculated only by detecting the armature current and ambient temperature and using the predetermined or directive armature voltage. In other words, in the calculating process as shown in FIG. 2, the predetermined or directed input armature voltage, the detected armature current and ambient temperature are used as input data 22 to calculate the highest temperature and the required cooling gas flow.

According to this embodiment, the armature voltage detecting device can be omitted, leading to a simpler configuration.

Third Embodiment

Figure 4:
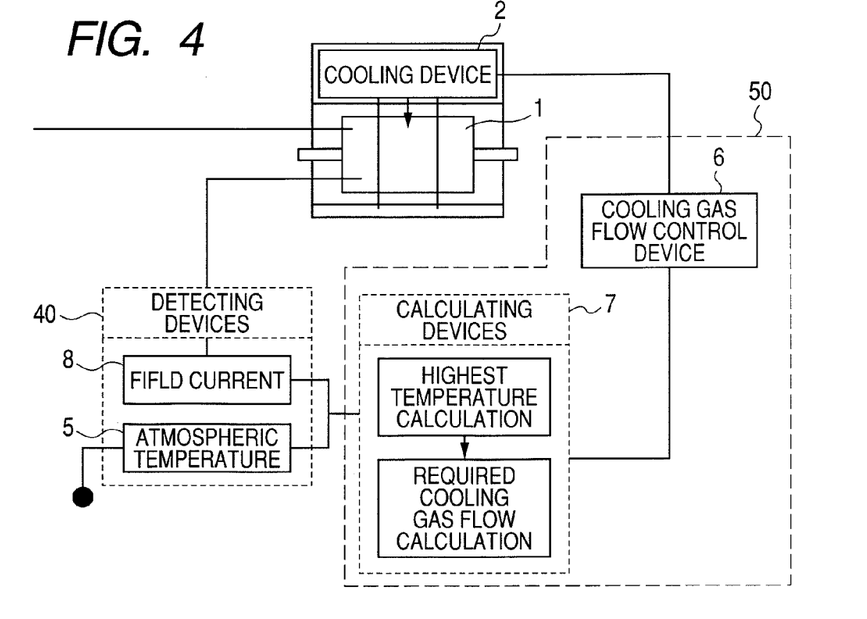
FIG. 4 shows the configuration of a third embodiment of the present invention.

FIG. 4 shows the configuration of a third embodiment of the present invention. It includes a field current detecting device 8 for detecting the field current of a rotary electric machine 1 and an ambient temperature detecting device 5. In this embodiment, a calculating device 7 calculates the highest temperature inside the rotary electric machine 1 from the results of the field current detecting device 8 and the ambient temperature detecting device 5. And then the calculating device 7 calculates the required cooling gas flow for the highest temperature inside the rotary electric machine 1 not to exceed a predetermined limit. A cooling gas flow control device 6 controls the cooling gas flow of a cooling device 2 so as to attain the required cooling gas flow as determined by the required cooling gas flow calculating device 7. In other words, in the calculating process as shown in FIG. 2, the predetermined armature voltage and armature current and the detected field current and ambient temperature are used as input data 22 to calculate the highest temperature and the required cooling gas flow.

This embodiment is useful when the temperature of the field windings is expected to be higher than that of the armature windings. The cooling gas flow is controlled for the temperature of the field windings so as not to exceed a predetermined limit, thereby reducing loss.

In this embodiment, the field current and ambient temperature are detected to calculate the highest temperature inside the rotary electric machine. However, if it is difficult to predict which temperature is higher between the field windings and the armature windings, the armature voltage and current may also be detected to calculate the highest temperature inside the rotary electric machine 1 as in the first embodiment.

Fourth Embodiment

Figure 5:
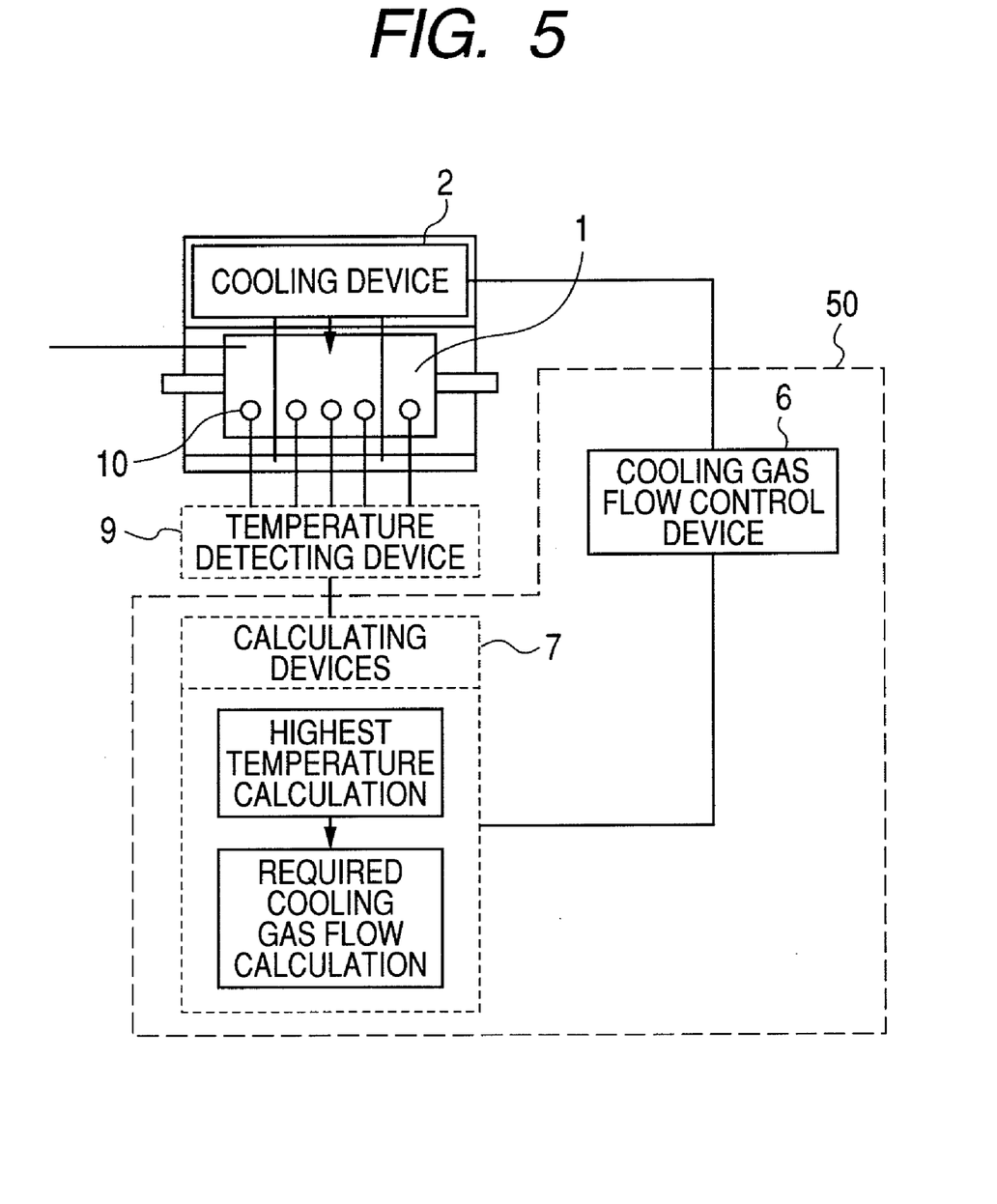
FIG. 5 shows the configuration of a fourth embodiment of the present invention.

FIG. 5 shows the configuration of a fourth embodiment of the present invention. A rotary electric machine 1 incorporates a plurality of temperature sensors 10 and a temperature detecting device 9 detects temperatures. A calculating device 7 calculates the highest temperature inside the rotary electric machine 1 from positions of the temperature sensors 10 and the detected temperatures and then calculates the required cooling gas flow for the highest temperature inside the rotary electric machine 1 not to exceed a predetermined limit. A cooling gas flow control device 6 controls the cooling gas flow of a cooling device 2 so as to attain the cooling gas flow as determined by the calculating device 7.

Figure 6:
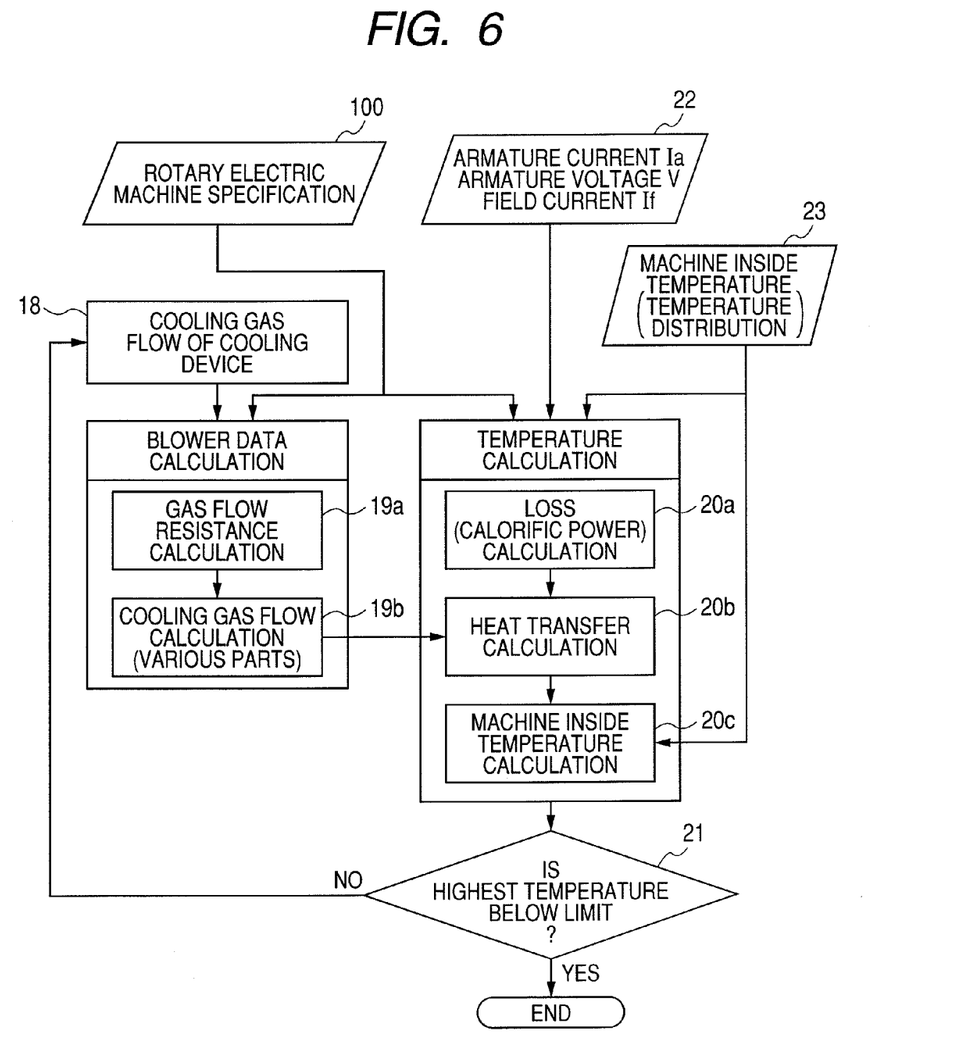
FIG. 6 illustrates a flow chart of cooling gas flow calculating process according to the fourth embodiment.
Figure 17:
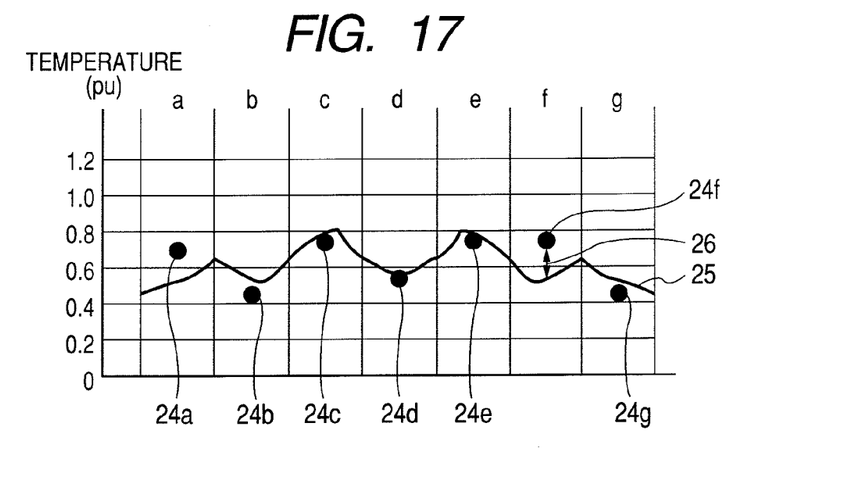
FIG. 17 is a graph showing detected temperatures and calculated temperatures of armature windings according to the fourth embodiment.

FIG. 6 shows a flow chart of the process of calculating the highest temperature. Predetermined values of armature voltage, armature current and field current are used as input data 22 for cooling gas flow calculating and loss calculating as in the first embodiment. And a temperature distribution data 23 for the armature windings as particularly shown in FIG. 17 is obtained and comparison is made between detected temperatures and calculated temperatures. The predetermined values of armature voltage, armature current and field current are, for example, estimated value introduced on the design process or directive value. In the case of FIG. 6, the lowest one among detected temperature values is used as the initial value for temperature calculation.

However, it is also possible to use a predetermined value (estimated value introduced on the design process, etc.) for the initial temperature. In a configuration in which the ambient temperature can be measured, the measured value of ambient temperature may be used as the initial value.

As shown in FIG. 17, detected temperatures 24a to 24g may be different from calculated temperatures 25. When some detected temperature values are higher than corresponding calculated temperature values, the temperature difference at the point where the difference 26 between detected and calculated temperatures is maximum is added to all calculated temperature values and the resulting temperature values are used to determine the required cooling gas flow. Conversely, if calculated temperature values are higher than all corresponding detected temperature values, the temperature difference at the point where the detected temperature is the lowest is subtracted from the calculated temperatures.

Since the highest temperature is calculated from temperatures detected at a plurality of points, the temperature inside the rotary electric machine can be estimated with higher reliability so that sound operation is assured and unnecessary cooling gas flow is reduced.

If a plurality of temperature detecting devices can be installed inside and outside of the rotary electric rotary electric machine 1, the temperature inside the rotary electric machine 1 can be estimated with higher accuracy by combining this embodiment with either of the first and second embodiments or with both.

In calculating the highest temperature, even if enough temperature data cannot be obtained due to a temperature sensor failure, temperature estimation can be made by interpolation of missing measurement points.

In that case, the test results of the following method are utilized for the interpolation.

(1) no-load heat-run test at a specified voltage with the armature terminals open-circuited (2) heat-run test at a specified armature current with the terminals short-circuited (3) zero excitation no-load heat-run test conducted in accordance with the equivalent testing method In this embodiment, if a communication device (not shown) is provided to notify the control room of the machine the detected temperature beyond a given level as an abnormal temperature, before damaging to the rotary electric machine 1 can be stopped.

Fifth Embodiment

Figure 7:
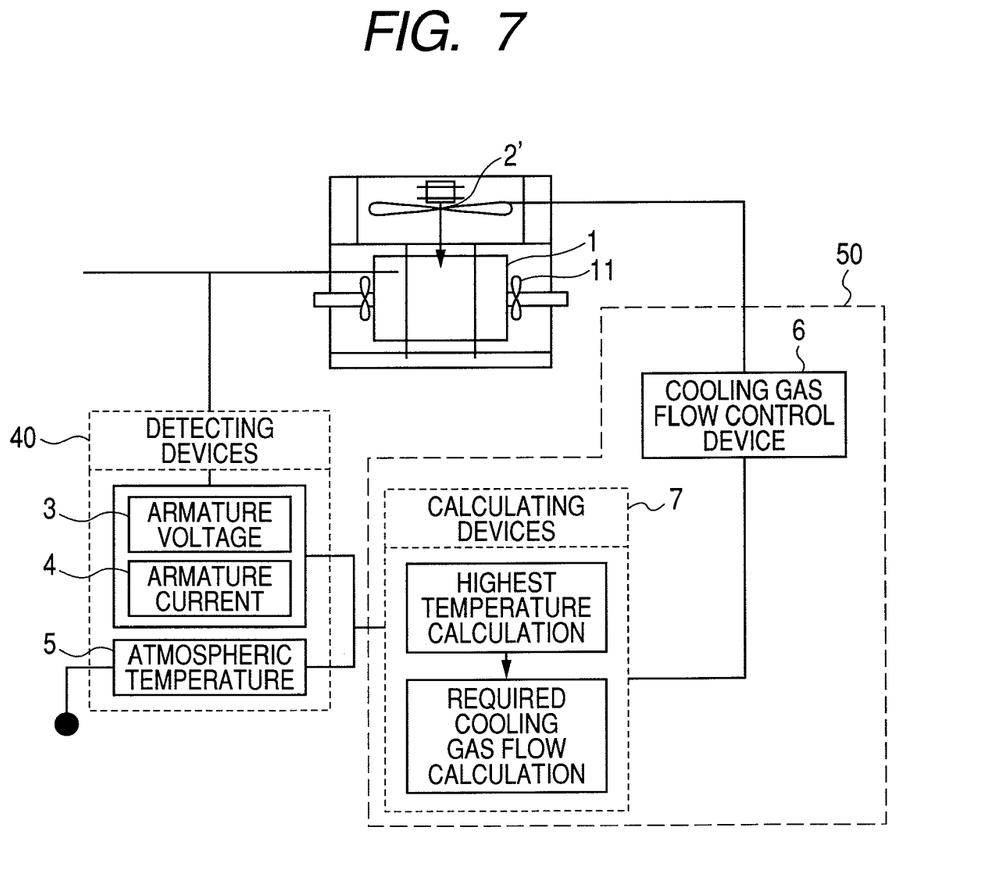
FIG. 7 shows the configuration of a fifth embodiment of the present invention.

FIG. 7 shows the configuration of a fifth embodiment of the present invention. An axial cooling fan 11 is attached to a rotor of a rotary electric machine 1. The inside of the rotary electric machine 1 is cooled by both the axial cooling fan 11 and a cooling fan 2' for controlling cooling gas flow. A calculating device 7 calculates the highest temperature inside the rotary electric machine 1 from the results of detection by an armature voltage detecting device 3, an armature current detecting device 4 and an ambient temperature detecting device 5 and then calculates the required cooling gas flow for the highest temperature inside the rotary electric machine not to exceed a predetermined limit. A cooling gas flow control device 6 controls the cooling gas flow of the cooling fan 2' so as to attain the required cooling gas flow as determined by the calculating device 7.

Figure 8:
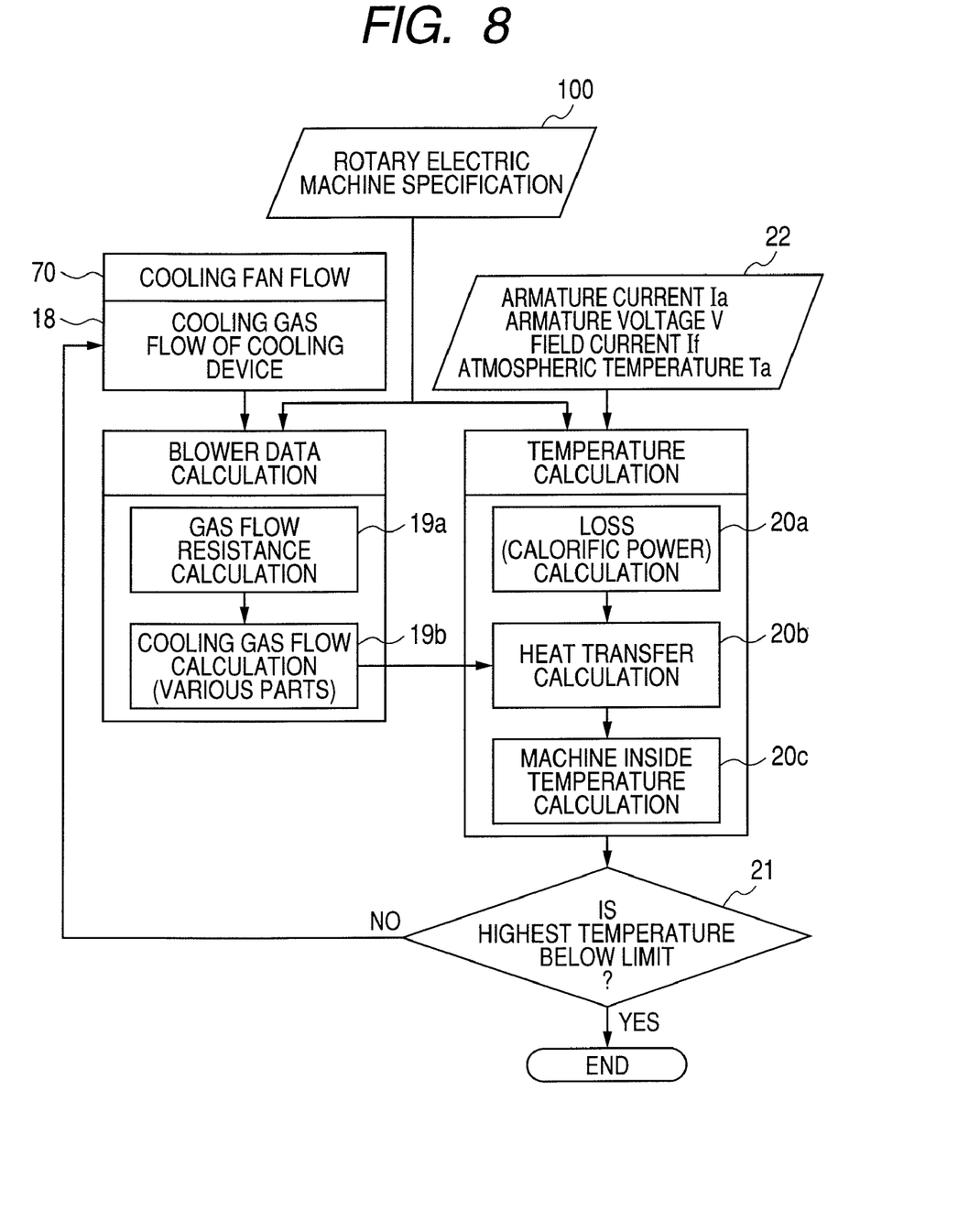
FIG. 8 illustrates a flow chart of cooling gas flow calculating process according to the fifth embodiment.

FIG. 8 shows a flow chart of the highest temperature calculating process. In the cooling gas flow cooling fan data calculating, the cooling fan flow rate data 70 is added to calculate the cooling gas flow.

According to this embodiment, even if the cooling device should stop, the rotary electric machine can continue operation by circulating cooling gas by the cooling fan 11 and lowering the rotary electric machine output.

Sixth Embodiment

Figure 9:
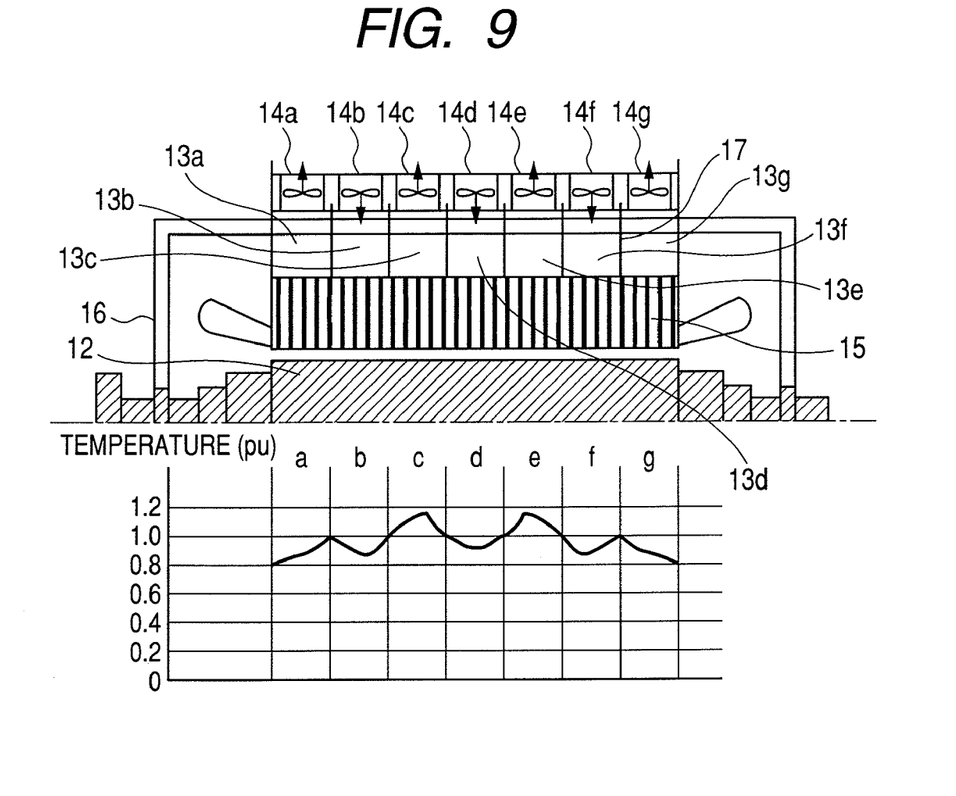
FIG. 9 is a sectional view of a rotary electric machine combined with an armature winding temperature distribution chart according to a sixth embodiment of the present invention.

FIG. 9 is a sectional view of a rotary electric machine according to a sixth embodiment of the present invention. In this embodiment, the rotary electric machine, configured as in the first embodiment, has a plurality of gas flow sections 13a to 13g which are axially separated by partitions 17 provided between a stator core 15 and a stator frame 16, and a plurality of cooling fans 14a to 14g for controlling cooling gas flow which correspond to the respective gas flow sections of the rotary electric machine are provided and the cooling gas flow rate of these fans 14a to 14g can be varied. The rotor is not provided with a cooling fan.

An example of a temperature distribution of armature windings in this case as calculated from the detected values of armature voltage, armature current and ambient temperature is shown below the sectional view where the temperature limit is 1.0 pu (pu: relative temperature value compared to the limit). The armature windings' temperature distributions are calculated from a measurement data obtained by a sufficiently fine section and a detailed distribution of temperatures on a section-by-section basis can be obtained as shown in the figure.

If the temperatures of gas flow sections 13c and 13e exceed the predetermined limit as in this case, the cooling gas flow ratios of the corresponding cooling fans 14c and 14e are increased.

According to this embodiment, by increasing only the cooling gas flow ratios of relevant gas flow sections, the loss due to unnecessary increment of cooling gas flow to the sections is reduced and the rotary electric machine can be operated with higher efficiency.

In this embodiment, if temperature distribution data can be obtained as in the fourth embodiment and comparison between detected temperatures and calculated ones can be made for each gas flow section, an adjustment may be made on the calculated temperature value for each gas flow section. Specifically, as shown in FIG. 17, for gas flow section a, detected temperature 24a is higher than the corresponding calculated temperature 25 and this difference is added to the calculated value; conversely, for gas flow section b, the difference is subtracted from the corresponding calculated value. This assures higher accuracy in temperature calculation on a section-by-section basis.

Seventh Embodiment

Figure 15:
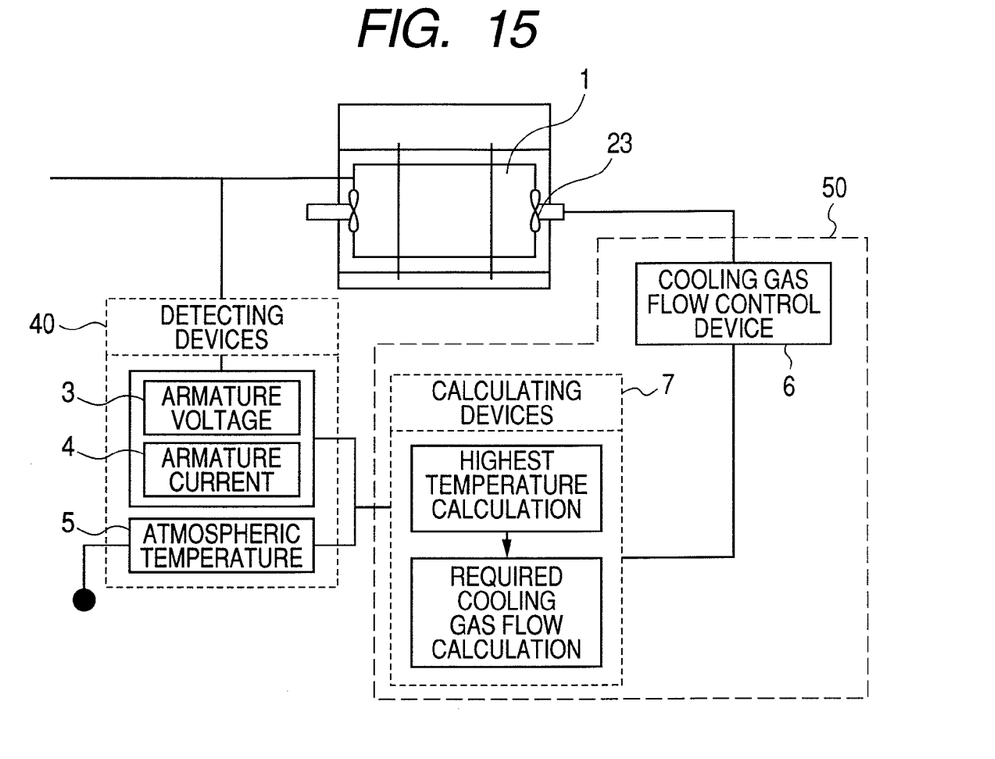
FIG. 15 shows the configuration of a seventh embodiment of the present invention.
Figure 16:
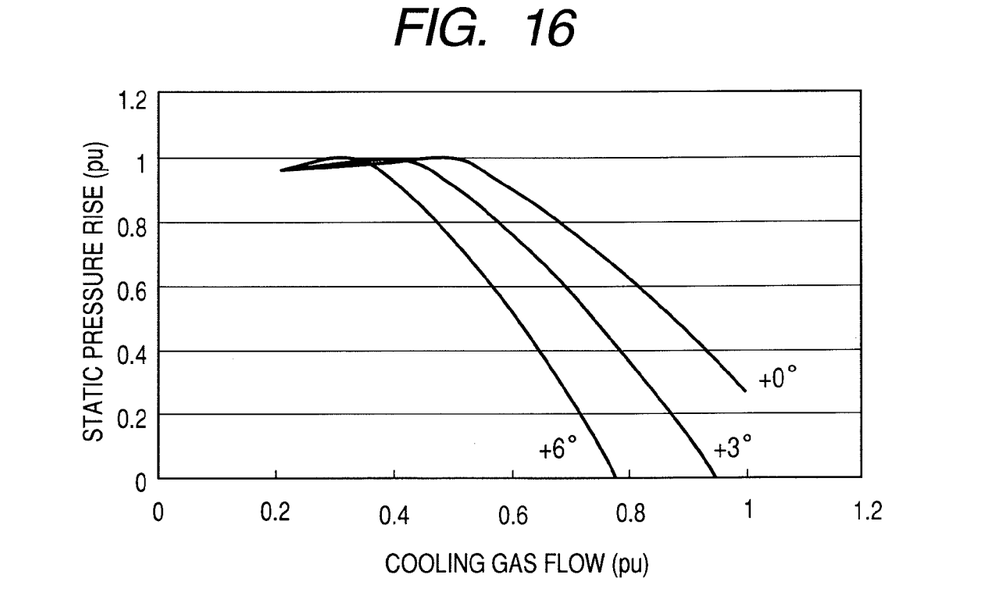
FIG. 16 shows cooling gas flow versus pressure characteristics in relation to the blade angle of a variable angle cooling fan.

FIG. 15 shows the configuration of a rotary electric machine according to a seventh embodiment of the present invention. As a cooling device for controlling cooling gas flow, an axial cooling fan 23 with variable angle blades attached to the rotor is used in place of the axial cooling fan 11. The other components are the same as in the first embodiment. FIG. 16 shows cooling gas flow of the cooling fan versus pressure characteristics in relation to blade angle of the axial fan. The use of an axial cooling fan 23 with variable angle blades permits cooling gas flow control without a significant change in the configuration of the rotary electric machine itself.

Eighth Embodiment

Figure 18:
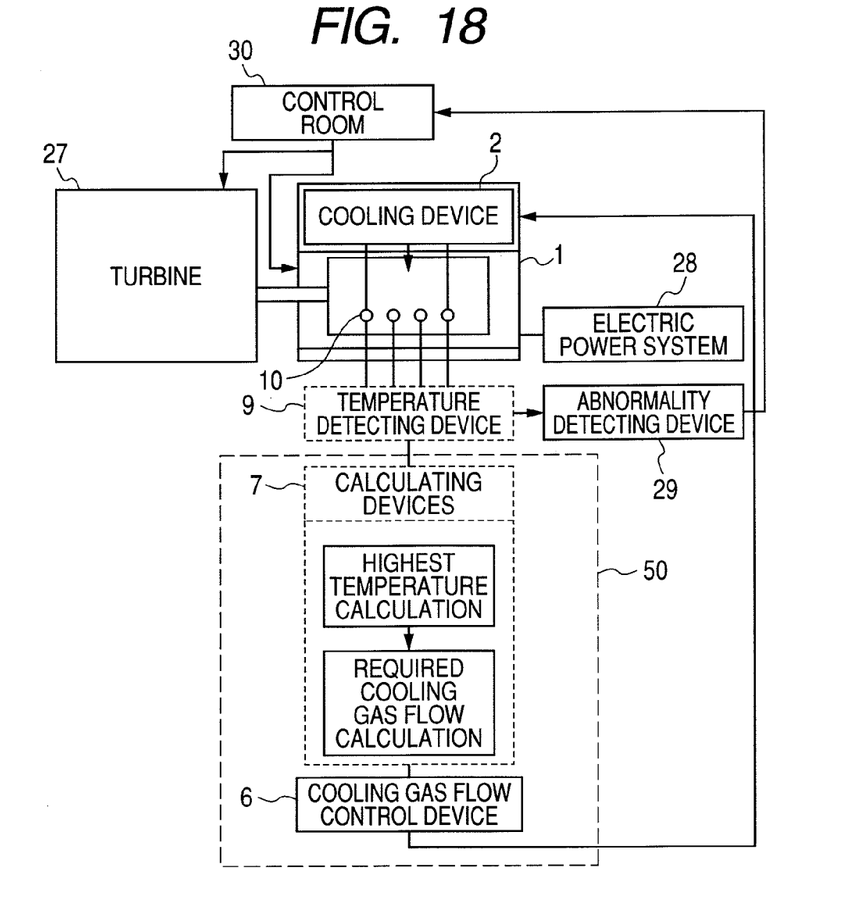
FIG. 18 shows the configuration of an eighth embodiment of the present invention.

FIG. 18 shows the configuration of an electric generating system according to an eighth embodiment of the present invention. A rotary electric machine 1 is connected with a turbine 27 through a coupling (not shown) and the turbine rotates a rotor to generate electricity and the generated electric power is supplied to an electric power system 28. An operator in a control room 30 operates and monitors the turbine 27 and the rotary electric machine 1.

Same as in the fourth embodiment, the rotary electric machine 1 incorporates a plurality of temperature sensors 10 and detects a temperature by a temperature detecting device 9. A calculating device 7 calculates the highest temperature inside the rotary electric machine from positions of the temperature sensors 10 and detected temperatures and then calculates the required cooling gas flow for the highest temperature inside the rotary electric machine not to exceed a predetermined limit. A gas flow control device 6 controls the cooling gas flow of a cooling device 2 so as to attain the cooling gas flow as calculated by the calculating device 7.

The rotary electric machine 1 has an abnormal temperature detecting device 29 for detected temperatures and if the temperature detecting device 9 detects a temperature beyond a predetermined level, a notice of abnormal temperature is given to the control room 30 and upon receipt of the notice, the control room 30 adjusts output of the turbine 27 and rotary electric machine 1.

As explained so far, according to the present invention, the cooling gas flow is controlled to the required level according to the highest temperature or temperature distribution in the rotary electric machine so that the highest temperature inside the rotary electric machine does not exceed a predetermined limit and the cooling gas flow inside the rotary electric machine is adequately controlled as needed to assure sound operation and the rotary electric machine is thus operated with high efficiency.

Furthermore, according to the present invention, since the rotary electric machine is provided with a device for calculating the highest temperature or temperature distribution inside the rotary electric machine, even if it is installed in a place where the ambient temperature or load may considerably vary, the cooling gas flow is adequately controlled as needed and the rotary electric machine is operated with high efficiency.

Furthermore, according to the present invention, if a table indicating required cooling gas flow ratios with respect to load and ambient temperature is prepared in advance, control work will be simplified.

What is claimed is:

1. A rotary electric machine comprising:
a stator with armature windings wound around a stator core;
a rotor with field windings wound around a rotor core and placed inside the stator concentrically in a rotatable manner;
a stator frame for housing the stator and the rotor;
a cooling device for controlling a cooling gas flow;
a plurality of gas flow sections axially partitioned between the stator frame and the stator;
a measuring device for measuring an ambient temperature of the rotary electric machine;
a detecting device for detecting at least one of the an armature voltage or an armature current or a field current;
a control means for controlling the cooling gas flow of the cooling device;
wherein a directive value of the cooling gas flow is given by the control means;
wherein a temperature distribution including a highest temperature value inside the rotary electric machine is calculated by the control means using the measured ambient temperature, at least one of the detection value of the detecting device and the directive value of cooling gas flow, and a new directive value of cooling gas flow is determined by the control means according to the calculated necessary cooling gas flow so that the highest temperature inside the rotary electric machine does not exceed a predetermined limit; and
a plurality of cooling devices corresponding to respective gas flow sections;
wherein the new directive value of cooling gas flow is determined by the control means for each of the plurality of the cooling devices corresponding to the respective gas flow sections.

2. The rotary electric machine according to claim 1, the control means comprising:
a calculating device for calculating the maximum temperature inside the rotary electric machine and necessary cooling gas flow; and
a gas flow control device which control the cooling gas flow according to the directive value of the cooling gas flow or new directive cooling gas flow determined by the calculating device.

3. The rotary electric machine according to claim 1, wherein a look-up table is provided in the control means in which the look-up table includes a data of the relation between at least one of the armature voltage or the armature current or the ambient temperature and the new directive value of cooling gas flow.

4. The rotary electric machine according to claim 1, wherein a look-up table is provided in the control means which includes the new directive value of cooling gas flow tabularized on a specified time basis.

5. The rotary electric machine according to claim 1, wherein the cooling device is a variable speed cooling fan.

6. The rotary electric machine according to claim 1, wherein the cooling device is at least one of an axial cooling fan attached to the rotor or a variable speed cooling fan.

7. The rotary electric machine according to claim 5, wherein the axial cooling fan attached to the rotor includes a variable angle blades.

8. The rotary electric machine according to claim 1, wherein a temperature detecting device is provided inside the rotary electric machine, and an adjustment is made according to temperature detected by the temperature detecting device in calculation of the temperature inside the rotary electric machine.

9. The rotary electric machine according to claim 1, further comprising:
   an abnormal temperature detecting device; and
   a control room of the rotary electric machine, wherein when the calculated temperature inside the rotary electric machine exceeds a predetermined value, an alarm of abnormal temperature is given to the rotary electric machine control room.

10. An electric generating system including the rotary electric machine of claim 1, wherein the rotary electric machine is an electric generator which is connected with a turbine through a coupling and generates electric power by the turbine rotating the rotor and supplies electric power to an electric power system.

11. A rotary electric machine comprising:
   a stator with armature windings wound around a stator core;
   a rotor with field windings wound around a rotor core and placed inside the stator concentrically in a rotatable manner;
   a stator frame for housing the stator and the rotor;
   a cooling device for controlling cooling gas flow;
   a plurality of gas flow sections axially partitioned between the stator frame and the stator;
   a measuring device for measuring an ambient temperature of the rotary electric machine;
   a control means for controlling a directive value of cooling gas flow;
   wherein an inside temperature distribution including a highest temperature value of the rotary electric machine is calculated by the control means based on the measured ambient temperature, and the directive value of cooling gas flow;
   wherein a new directive value of cooling gas flow is determined by the control means according to the calculated inside temperature distribution of the rotary electric machine, in which the highest temperature value inside the rotary electric machine is calculated by using at least one of the predetermined value of an armature voltage or an armature current or a field current so that the highest temperature inside the rotary electric machine does not exceed a predetermined limit; and
   a plurality of cooling devices corresponding to respective gas flow sections;
   wherein the new directive value of cooling gas flow is determined by the control means for each of the plurality of the cooling devices corresponding to the respective gas flow sections.

12. The rotary electric machine according to claim 11, wherein the predetermined value is a design value introduced on a design process.

13. The rotary electric machine according to claim 11, wherein the predetermined value is the directive value initially provided to the rotary electric machine.

14. A rotary electric machine comprising:
   a stator with armature windings wound around a stator core;
   a rotor placed inside the stator concentrically in a rotatable manner;
   a stator frame for housing the stator and the rotor;
   a cooling device for controlling cooling gas flow;
   a plurality of gas flow sections axially partitioned between the stator frame and the stator;
   a device for detecting a temperature inside the rotary electric machine;
   a detecting device for detecting at least one of the an armature voltage or an armature current or a field current;
   wherein the temperature distribution including a highest temperature value inside the machine is calculated from the temperature detected by the detecting device, a detection value by the detecting device and an directive value of cooling gas flow, and a new directive value of cooling gas flow is determined according to the calculated temperature distribution inside the rotary electric machine so that the highest temperature inside the rotary electric machine does not exceed a predetermined limit; and
   a plurality of cooling devices corresponding to respective gas flow sections;
   wherein the new directive value of cooling gas flow is determined by the control means for each of the plurality of the cooling devices corresponding to the respective gas flow sections.

15. The rotary electric machine according to claim 14, further comprising:
   the plurality of gas flow sections includes a different direction of gas flow in relation with each other.

* * * * *